United States Patent [19]

Kraemer et al.

[11] Patent Number: 5,179,486
[45] Date of Patent: Jan. 12, 1993

[54] HEAD POSITIONING AND TAPE SUPPORT APPARATUS FOR DATA RECORDER

[75] Inventors: John C. Kraemer, Oakdale, Minn.; Paul R. Iverson, St. Croix Falls, Wis.

[73] Assignee: Minnesota Mining and Manufacturing Company, St. Paul, Minn.

[21] Appl. No.: 578,736

[22] Filed: Sep. 6, 1990

[51] Int. Cl.⁵ .................. G11B 5/55; G11B 21/08; G11B 21/16
[52] U.S. Cl. .................. 360/106; 360/129
[58] Field of Search .................. 360/106, 129

[56] References Cited

U.S. PATENT DOCUMENTS

| | | | |
|---|---|---|---|
| 4,110,803 | 8/1978 | Townsend | 360/106 |
| 4,300,179 | 11/1981 | Barnes et al. | 360/127 |
| 4,600,955 | 7/1986 | Regruit | 360/106 |
| 5,047,888 | 9/1991 | Mitsuhashi et al. | 360/129 |

Primary Examiner—Robert S. Tupper
Attorney, Agent, or Firm—Kinney & Lange

[57] ABSTRACT

A housing apparatus is operable to align a record/playback head with respect to different parallel tracks on a moving magnetic tape in such a manner as not to disturb the positioning of the tape as it passes longitudinally along its transport path. The housing apparatus includes a housing body having a convex, rounded front face lying in contacting relation with respect to the moving magnetic tape at two closely spaced-apart areas. A record/playback head is transversely movable with respect to the housing body and extends through a provided opening in the body to lie in contact with the moving tape between the two tape contacting areas of the housing body front face. Means is provided to move the record/playback head transversely with respect to the tape while the moving tape is in contact with these two areas on either side of the head.

22 Claims, 4 Drawing Sheets

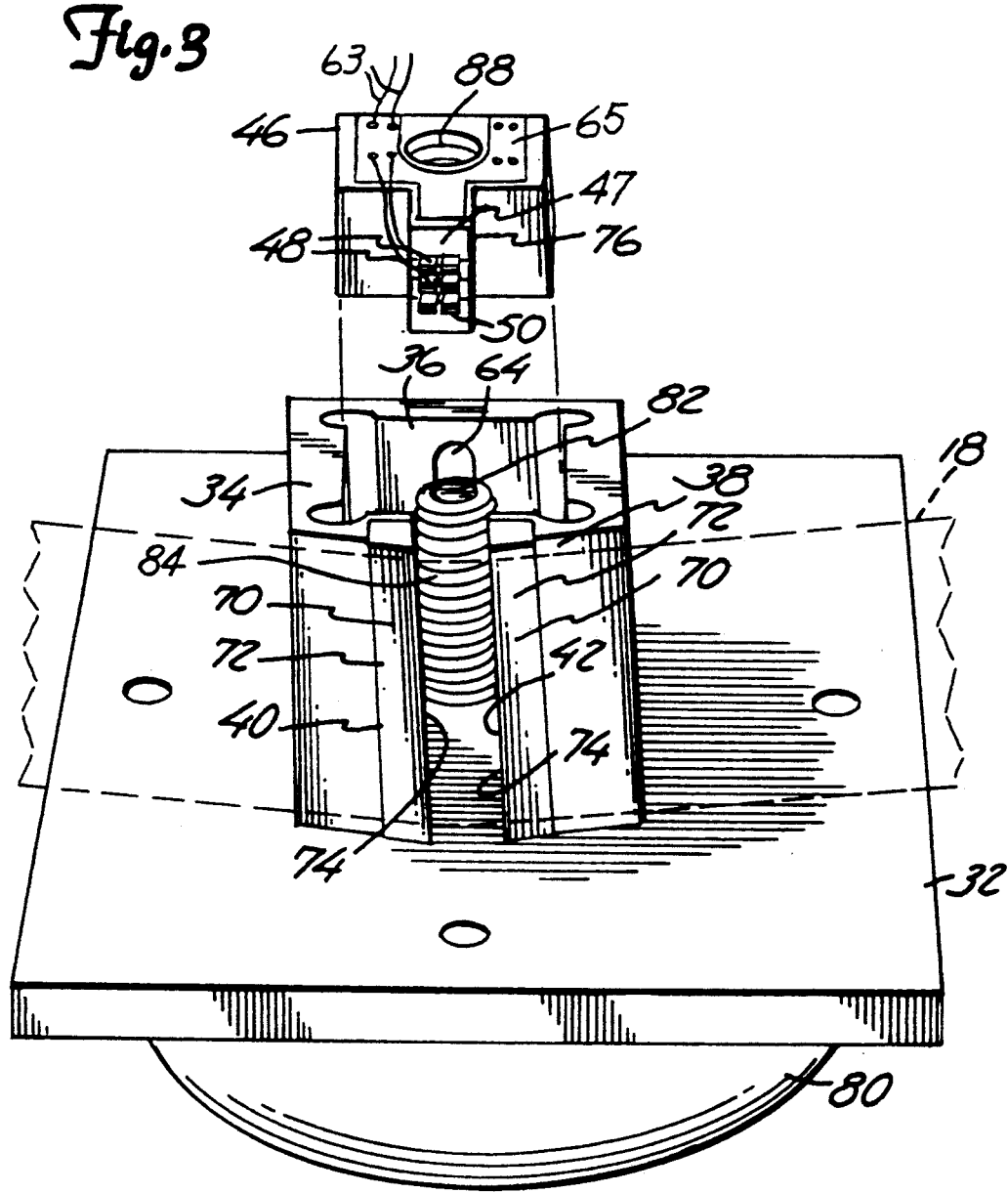

HEAD POSITIONING AND TAPE SUPPORT APPARATUS FOR DATA RECORDER

BACKGROUND OF THE INVENTION

This invention has relation to machines for magnetic recording and playback of data on a plurality of parallel tracks of a record medium such as a moving magnetic tape, and particularly to a subassembly of such a machine for moving record/playback heads transversely of the direction of movement of the magnetic tape to align such heads with various of the magnetic tracks on the tape.

The problem and importance of aligning record tracks on magnetic mediums with composite magnetic cores is discussed in U.S. Pat. No. 4,300,179 granted to Barnes and von Behren on Nov. 10, 1981 in the Background of the Invention at column 1, beginning on line 10.

The importance of maintaining contacts between the record medium and the magnetic head and of providing support for the record carrier or tape as the magnetic head is laterally aligned with various recorded tracks on the tape is discussed in this same patent to Barnes et al at column 2, paragraph beginning on line 5.

There is a problem growing out of the necessity of assembling an entire magnetic head, including the core windings, before testing; and then, after testing, having to, oftentimes, throw away the entire head if the testing shows that it is faulty. This problem is likewise discussed by Barnes et al at column 2, paragraph beginning on line 21.

When magnetic head assembly of the prior art was assembled, tested, installed for use and subsequently a coil winding failed, the entire housing for the head assembly had to be torn down and replaced. Barnes, supra, column 2, beginning on line 27.

This Barnes et al patent presents a composite magnetic head with multi-track support structure which gives good support to the entire transverse width of the magnetic tape as magnetic head and the entire support structure moves up and down in contact with the horizontally moving tape. To accomplish this, a yoke 20 supports record/playback heads 10, 12 and 14 and provides a top surface 22 having the same scrub path as these heads. Because the entire yoke moves with the heads, to support the magnetic tape at all times, the yoke "extends in both directions transversely of the record carrier at least a distance equal to width of the record carrier in each direction." Abstract of Barnes, supra and FIG. 4.

This movement of the yoke 20 of Barnes et al transversely of the record carrier as the record carrier moves on its path, necessarily causes more scrubbing action of the carrier on the center portions of the yoke than on either end portion, since each end portion is, at least part of the time, not in touch with the moving record carrier. For this reason, the wear of the yoke is uneven. Such non-uniform wear of the yoke results in the record carrier running on a surface which is not flat and this disturbs the needed smooth and even contact between the moving carrier and the magnetic head(s).

By this reference, this patent to Barnes et al, U.S. Pat. No. 4,300,179, granted Nov. 10, 1981, is incorporated into this specification and made a part of this disclosure.

Because of the need to move the entire yoke substantially twice the width of the record carrier in direction transverse to the direction of the record carrier tape movement, the overall height of the multitrack support structure was a continuing design problem in an environment where miniaturization has become increasingly important.

Other patents which are related to this invention are U.S. Pat. No. 4,686,596 granted to Kraemer and Iverson on Aug. 11, 1987; U.S. Pat. No. 4,658,314 granted to Sasazaki on Apr. 14, 1987; U.S. Pat. No. 4,322,764 granted to Tamaka on Mar. 30, 1982; U.S. Pat. No. 4,313,143 granted to Zarr on Jan. 26, 1982; U.S. Pat. No. 3,692,255 granted to von Behren on Sep. 19, 1972; and U.S. Pat. No. 3,539,191 to Yamamoto on Nov. 10, 1970.

What was not present before the present invention was a subassembly which provided stationary structures to come into contact and support a longitudinally moving magnetic tape over its entire transverse width on both sides of composite magnetic heads which are in contact with the magnetic tape and are being moved transversely to the direction of movement of the tape.

Also needed was a structure in which failure or excessive wear of magnetic cores can be overcome by removal and replacement of a moving head holder and its magnetic core(s) without the need for replacing the entire multitrack support structure or housing apparatus. Additionally, to achieve further miniaturization, a housing apparatus was needed that was closer to the transverse width of the record medium magnetic tape being used, and not to twice that width.

SUMMARY OF THE INVENTION

A magnetic recording and playback machine transporting a longitudinally moving record medium past a record/playback head includes a housing apparatus positioned next to the transport path and including a housing body having a convex non-linear front surface lying in contacting relation to the record medium across its entire transverse dimension at two spaced-apart locations along its transport path. The housing body is provided with a head holder receiving cavity or encompassing opening which is open through its front surface between the spaced-apart locations. A record/playback head holder is mounted in this housing body opening for movement with respect to the housing body in direction transverse to that of the record medium movement. At least one record/playback head is mounted in the head holder, the head including a composite magnetic core having a core body which includes a pair of side legs together partially defined by a convex curved forward face, this forward face having an effective non-magnetic gap therethrough. Means is provided to move the head holder transverse to the direction of the record medium movement. The core body is mounted in the head holder so that its curved front portion, including the effective non-magnetic gap, extends beyond the non-linear front surface of the housing body and between its spaced-apart locations, into contact with the record medium and in aligned relation to the direction of record medium movement.

BRIEF DESCRIPTION OF THE DRAWINGS

FIG. 3 is an exploded perspective view of some of the parts of the housing apparatus of the invention with the position of the magnetic tape to that apparatus shown in phantom; and FIG. 4 is an enlarged perspective view of a typical composite magnetic core useful in the housing apparatus of the present invention.

DETAILED DESCRIPTION OF THE PREFERRED EMBODIMENTS

Figure 1:
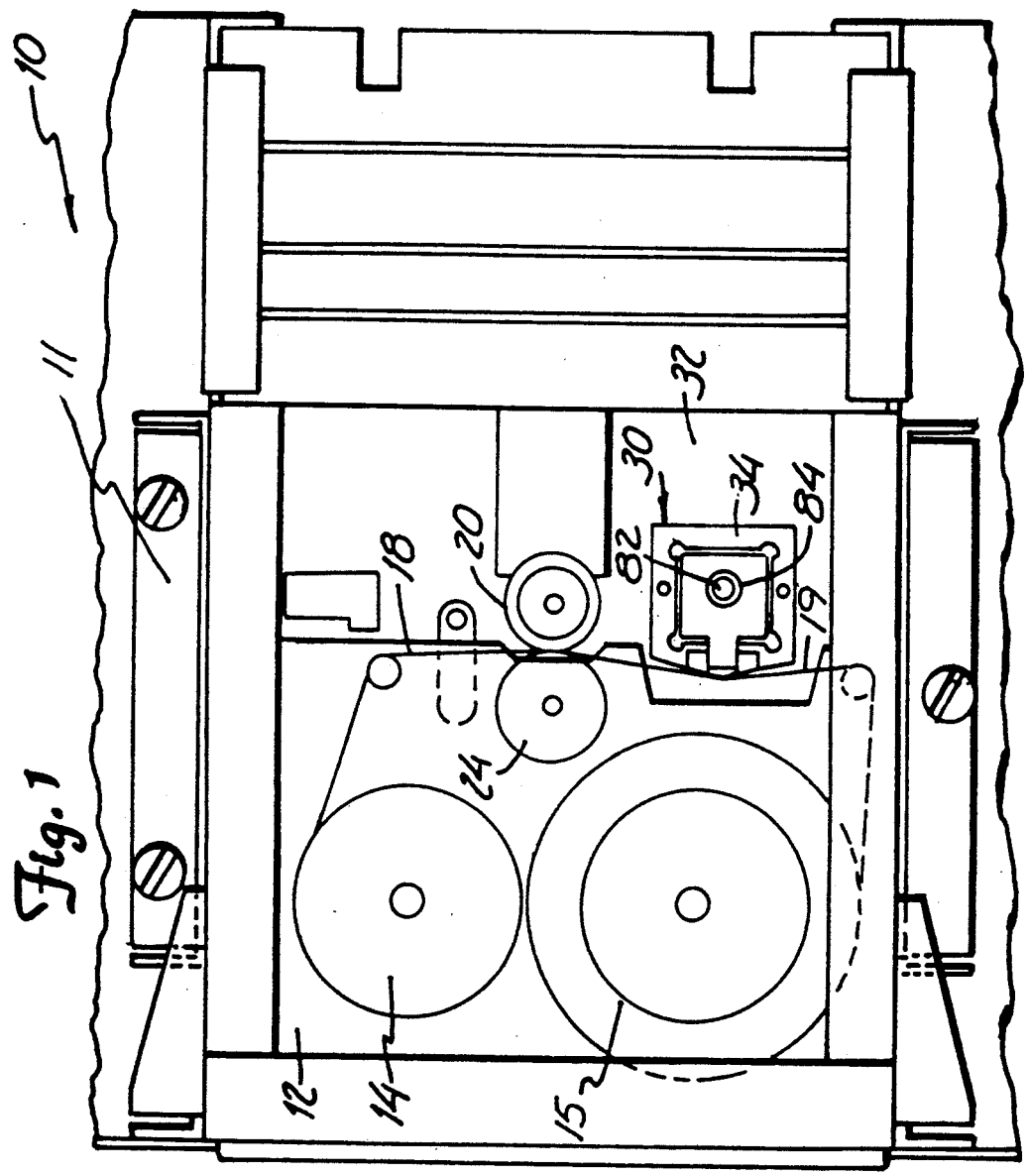
FIG. 1 is a fragmentary top plan view of a machine for magnetic recording and playback of data showing the relationship of a housing apparatus of the present invention to a moving record medium or magnetic tape running longitudinally on its tape transport path between two tape reels in a tape cartridge within that machine.

A magnetic recording and playback machine 10 includes a main frame 11 and a tape cartridge 12 in which are mounted two tape reels, 14 and 15, carrying a record medium in the form of a magnetic tape 18 running between them on a tape transport path 19.

The machine 10 includes a powered tape drive roller 20 rotatably mounted and driven in the main frame 11 of the machine. A tape drive backup roller 24 is rotatably supported in the cartridge 12, and the magnetic tape 18 is gripped between these rollers to be transported between the reels 14 and 15. This part of the machine 10 is well known in the art and is disclosed in U.S. Pat. No. 3,692,255 granted on Sep. 19, 1972 to von Behren. The means for driving the record medium or magnetic tape 18 on the tape transport path 19 such as seen in FIG. 1 forms no part of the present invention per se.

The invention relates to a housing apparatus 30 which, as seen in FIG. 1, is mounted on a cartridge support deck or mount plate 32 in such a manner that the magnetic tape 18, moving longitudinally along the tape transport path 19 comes into operational contact with that part of the housing apparatus where data is to be recorded on and/or played back from the tape. The housing apparatus will be equally effective whether the tape moves in a single direction as suggested in FIG. 1 or whether the tape is driven in both longitudinal directions.

Figure 2:
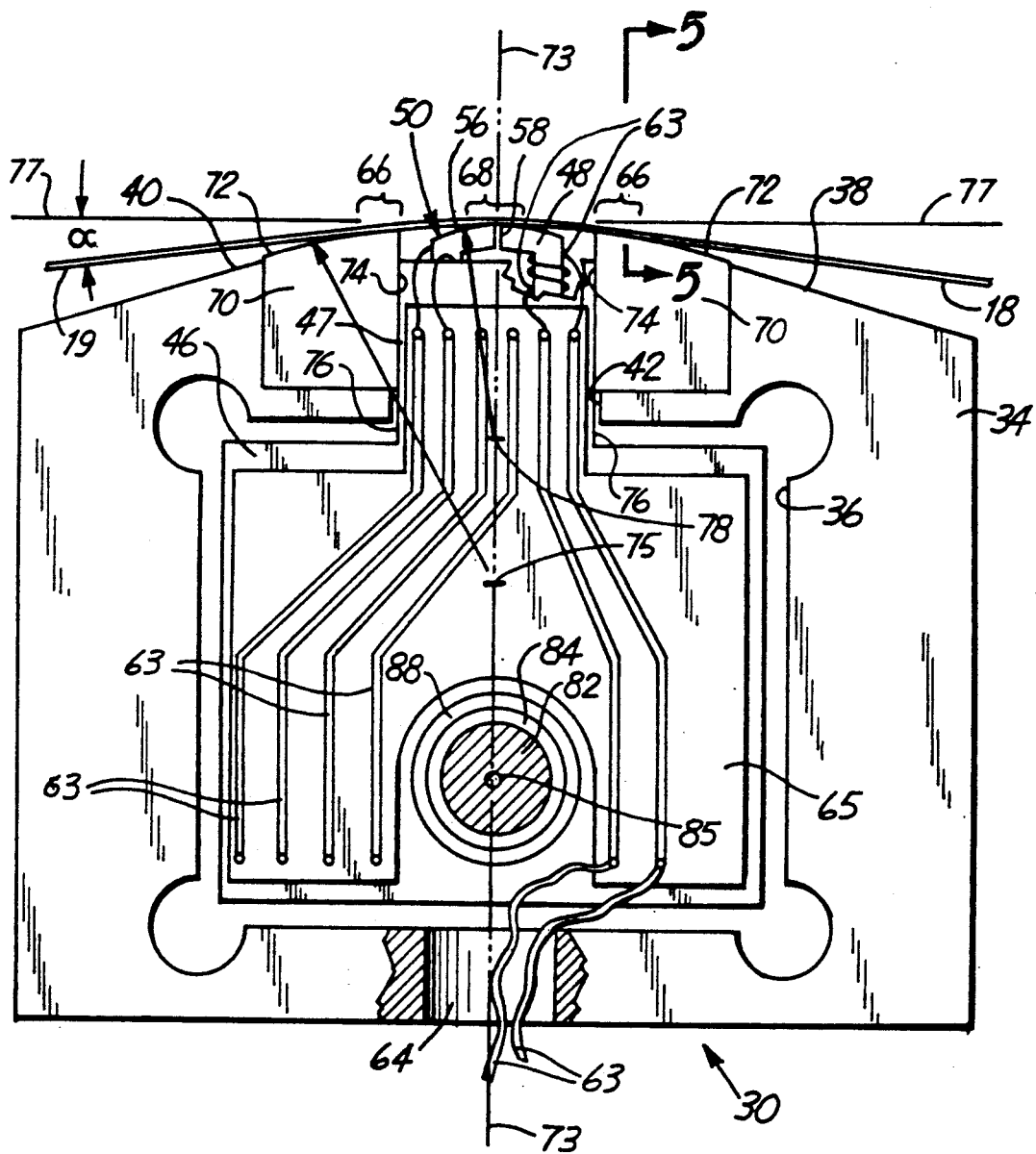
FIG. 2 is enlarged top plan view of the housing apparatus of FIG. i showing its relationship to the tape transport path of the longitudinally moving magnetic tape.
Figure 2A:
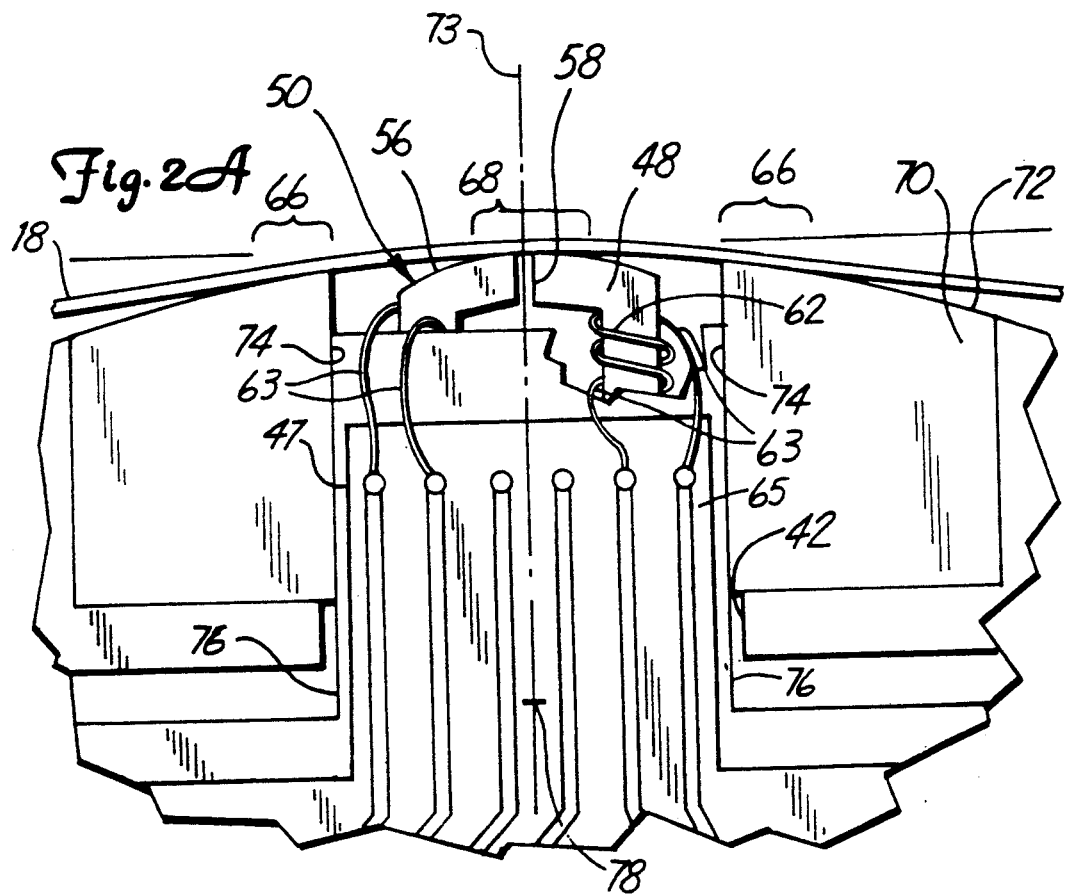
FIG. 2A is a further enlarged, fragmentary, top plan view of a central, upper portion of the housing apparatus as seen in FIG. 2.

As best seen in FIG. 2, the housing apparatus 30 includes a housing body 34 supported on mount plate 32, and provided with a head holder encompassing cavity or housing body cavity 36 therein. A front wall 38 of the housing body 34 is defined by a front surface 40 which is non-linear in longitudinal cross section and includes a convex front face portion as shown. This front wall 38 is divided in half by the presence of a magnetic core positioning tongue receiving slot or housing body slot 42 provided in the housing body. This slot 42 is open from the front surface 40 of wall 38 to the cavity 36.

A record/playback head holder 46 is mounted in the housing body 34 for movement with respect to that body in direction transverse to the direction of movement of the magnetic tape 18 moving on its transport path 19 past the housing apparatus 30.

As shown in FIG. 3, a plurality of record/playback heads 48 are mounted in a core positioning tongue 47 of the head holder 46. Each head includes a composite magnetic core 50 having a core body 52 which includes side legs 54,54, each providing part of a convex curved forward face 56. An effective nonmagnetic gap 58 is provided between the side legs 54,54. A base leg 60 of the core body 52 completes a magnetic path to the effective gap 58. At least one wound-wire coil 62 surrounds one of the legs of the core body 52, and its lead wires 63,63 extend forwardly of core positioning tongue 47, up to and through a circuit board 65 mounted on top of head holder 46 and out of the housing body 34 through a provided opening 64 in the housing body.

As shown, each composite magnetic core 50 extends forwardly of the core positioning tongue 47 which itself extends into the housing body slot 42. Each magnetic core 50 extends through the slot 42 sufficiently so that it comes into contact with the magnetic tape 18.

One of the objects of the invention is to have the curved forward face 56 formed by the side legs 54 extend into the tape transport path of the tape 18 sufficiently so that good contact will be made on both sides of the gap 58 for the purpose of recording and playback, but not enough so that the longitudinal movement of the magnetic tape will be disturbed when the cores in contact with the tape move transversely to the direction of tape movement.

As the magnetic tape 18 moves longitudinally on its tape transport path 19, it comes into contact with two closely spaced-apart areas of the front surface 40 of the front wall 38 of the housing body 34. The tape also comes into contact with the curved area of forward face 56 formed by side legs 54 of the core body 52 between those contacted surface areas of wall 38. All these areas of contact can be designated as scrub surfaces. The scrub surfaces on the front wall 38 of the housing body 34 are designated 66,66 and the scrub surface on the forward face 56 of the magnetic core 50 is designated 68.

In FIG. 3 the magnetic tape 18 is shown in phantom in relation to the rounded front surface 40 of the front wall 38 of the housing body 34. Since that housing body is fixedly mounted with respect to the mount plate or cartridge support deck 32 of the recording and playback machine 10, and since the magnetic tape 18 is moving through a transport path 19 such that the top and bottom edges of the tape each move in its own plane parallel to the surface of the mount plate 32, there is no tendency to move the tape out of its path transversely of the direction of its longitudinal movement except for the movement of the curved forward faces 56 of the core bodies 52 as the head holder 46 is moved transversely to align the composite magnetic cores 50 with the different magnetic tracks on the tape 18.

The scrub surfaces 66, 68, and 66 are subjected to wear as they are scrubbed upon by the movement of magnetic tape 18. In the prior art, where the entire magnetic head support surface moves up and down transversely of the direction of movement of the tape, the scrub surfaces on either side of the magnetic head tended to wear unevenly. As the magnetic head moved toward the top of the tape, the lower support surfaces out of contact with the tape would not wear while the areas still in touch with the tape would continue to wear. Likewise, when the head moved toward the bottom of the tape, certain upper areas of the support surfaces were out of touch with the tape. This meant that the support surfaces tended to wear unevenly with the central portion of those surfaces getting much more wear than the top and bottom portions thereof.

In the structure of the present invention, the scrub surface 68 on the forward face 56 of all of the core bodies 52 and the scrub surfaces 66,66 of the two spaced-apart surface areas of the front surface 40 of the front wall 38 of the housing body 34 are always in contact with the tape. Whenever the tape is moving, all these areas receive uniform wear. By making the front surface 40 of the front wall 38 of materials which tend to wear at the same rate as the forward faces of the core bodies 52, the relationship between the moving magnetic tape 18 and the housing apparatus 30 will be maintained as this wear proceeds evenly.

To minimize this wear, to support the tape on both sides of the movable magnetic heads 48, and to support the entire transverse dimension of the magnetic tape, a pair of ceramic bars 70,70 are inserted into the front wall 38 as clearly seen in FIGS. 3 and 4. To insure evenness of wear, these bars are made of materials which wear at the rate as the forward faces 56 of the core bodies 52 of the composite magnetic core 50. These bars 70 are bonded in place with suitable bonding medium in any usual or preferred manner forming no part of this invention as such.

This use of ceramic materials and materials in the forward faces of the core body side legs in order to achieve minimum friction and even wear is well known to those skilled in the art. The term "ceramic block" is used generically throughout to refer to any kind of a relatively long-wearing, low-friction material having relatively thermally stable dimensions and which will be suitable for the purpose. For example, blocks of calcium titanate have been found to be satisfactory.

To move the head holder 46 transversely with respect to the direction of tape movement, and as best seen in FIG. 3, a servo motor 80 is fastened below the mount plate 32 and a servo motor drive shaft 82 extends upwardly into the housing body cavity 36. As shown in FIG. 2, a lead drive screw 84 is concentric and integral with the drive shaft 82 about a head holder drive axis 85.

The record/playback head holder 46 is provided with an internal screw follower thread 88 also concentric about drive axis 85. With the parts in assembled relation, the servo motor 80, by rotating its drive shaft 82 and the lead drive screw 84, will cooperate with the internal screw follower thread 88 to move the head holder 46 up and down to align the record/playback heads 48 with appropriate tracks on the magnetic tape 18 in any well known or preferred manner.

The ceramic bars 70,70 are partially defined by mutually precisely parallel, inwardly facing, plane edge surfaces 74,74 which lie in parallel relationship with respect to the axis 85 of the lead screw 84. These plane surfaces 74 form guide surfaces for the core positioning tongue 47. The core positioning tongue 47 is partially defined by mutually precisely parallel, outwardly facing, plane, head holder positioning surfaces 76,76 each parallel to the axis 85 of the internal screw follower thread 88, each of these surfaces being positioned from the other so as to lie in contacting, guided relationship with respect to one of the two inwardly facing edge surfaces 74,74.

The scrub surfaces 66,66 form part of curved front facing magnetic tape bearing surfaces 72,72 on the ceramic bars 70,70. These surfaces 72,72 are all part of the non-linear front surface 40 of the front wall 38 of the housing body. As shown, each of these front facing surfaces 72,72 defines a portion of the same right circular cylinder having its center 75 in a vertical plane 73,73 which includes the head holder drive axis 85 and lies in parallel relation to and between the head holder positioning surfaces 76,76. The curved forward faces 56 of all of the side legs 54 of the record/playback heads 48 lie on the surface of another right circular cylinder also having a center 78 in plane 73,73. In one satisfactory form of the invention, the radius of the right circular cylinder defining the front facing bearing surfaces 72,72 can be 0.625", and the radius of the curved faces 56 of the side legs 54 can be 0.150". With these dimensions, it has been found particularly useful to position the record/playback heads 48 so that the curved forward face 56 encompassing the effective gap 58 protrudes beyond a line drawn between the forwardmost edges of the front facing bearing surfaces 72,72 of the ceramic bars for a distance of 0.001". The radii of the right circular cylinders defining surfaces 72 and 56 can be varied to fit the requirements of a particular design and this can effect the optimum protrusion of face 56 beyond bearing surfaces 72,72; but, in order to achieve the relationship shown in FIG. 2 between the magnetic tape 18 and the forward surfaces 72, 56,56 and 72, the radius defining the curved forward face 56 will be less than or equal to the radius defining the surfaces 72.

The complete outside limits have not yet been determined, but it has been determined that a preferred angle $\alpha$ between a plane 77,77 touching the effective gap 58 and lying in transverse relationship to the parallel facing guide surfaces 74,74 of the ceramic bars 70 and the plane of the magnetic tape on its tape transport path 19 as it approaches and/or leaves contact with a front facing bearing surface 72 can vary between 3° and 30°.

While a plurality of composite magnetic cores 50 are shown and discussed, it is evident that the apparatus of the invention will function in the same manner were only one core 50 to be used.

In accordance with usual practice, the lines formed by the intersection of front facing magnetic tape bearing surfaces 72,72 and parallel plane edge surfaces 74 of the ceramic bars 70 will be relieved or "broken" slightly so that there will be no tendency of the moving magnetic tape 18 to be scraped or scrubbed on those edges.

Figure 5:
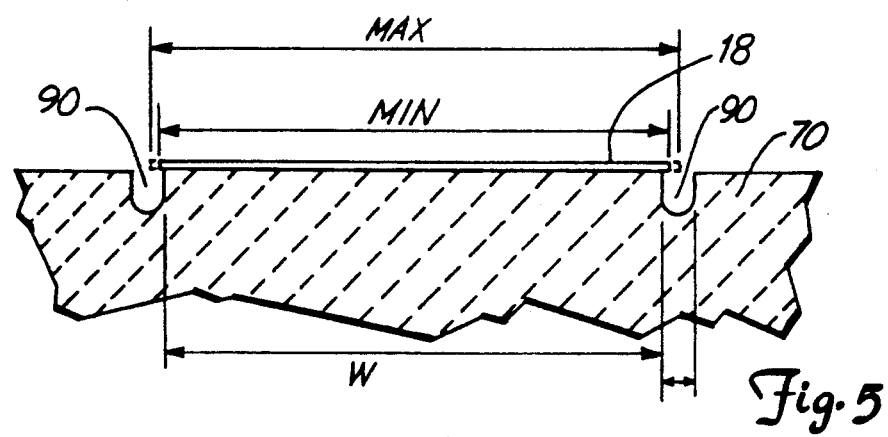
FIG. 5 is an enlarged, fragmentary, vertical sectional view taken on line 5—5 in FIG. 2.

Since the magnetic tape 18, moving on the tape transport path 19 over the ceramic bars 70,70 no longer has any transverse motion with respect to those bars, the transverse wear problem present in the structure of U.S. Pat. No. 4,300,179 to Barnes et al, discussed above, is eliminated. However, the transverse dimension or width of magnetic tapes of a nominal size does vary. For example, such a tape having a nominal width of ¼" can be expected to vary between 0.246" and 0.248". Even though the tape is moving constantly over the same part of the ceramic bars 70,70, when the tape has a maximum width it is wearing to the very outside edges of its path. When the tape has its minimum width, it is not contacting the outermost dimensions of its path, and the innermost width is wearing down faster than the outermost width or transverse dimension. This results in a tendency of the ceramic bars to wear to form curved upper and lower edges. As time goes on and the wear continues, whenever the tape is not at its minimum dimension, the outer edges of it tend to curl up. This is unsatisfactory and unacceptable as the contact of the tape with the magnetic heads at the upper and lower edges of the tape is disturbed and the read/write function is impaired. The structure to alleviate this is shown in FIG. 5 where a relief channel 90 is cut in each of the ceramic bars. The inner adjacent edges of the channels 90,90 are spaced apart a distance slightly less than the minimum expected transverse dimension or width of the tape 18, and the outer edges of the channels 90,90 are spaced apart far enough so that the maximum expected dimension of the tape will never exceed distance between the outer edges of the channels. For example, for magnetic tape having a nominal listed width of one quarter of an inch, and the width of the tape can be expected to vary between 0.245" and 0.248", the relief channel can be from 10 to 15 mils wide and deep. From tapes of other nominal widths, the relief channels can have similar appropriate dimensions depending on the expected variations in tape width.

Although the present invention has been described with reference to preferred embodiments, workers skilled in the art will recognize that changes may be made in form and detail without departing from the spirit and scope of the invention.

What is claimed is:

1. In a machine for magnetic recording and playback of data on a plurality of parallel tracks of a record medium which is moving longitudinally on a transport path past a record/playback head, a housing apparatus operable to selectively align at least one record/playback head with respect to each one of the record tracks; the housing apparatus including:
   (a) a housing body fixedly secured proximate to the transport path and having a front face convex and curved in longitudinal section and lying in contact with the record medium across the entire transverse dimension of the record medium at two closely spaced-apart locations along the record medium transport path, the housing body being provided with a head holder receiving cavity therein which is open through its curved front face between the two spaced-apart locations;
   (b) a record/playback head holder mounted in the housing body cavity for movement with respect to the housing body in direction transverse to the direction of record medium movement;
   (c) at least one record/playback head mounted in the head holder, said head including a composite magnetic core having a core body which includes a pair of side legs together defining a convex curved forward face, the side legs being spaced apart to provide an effective non-magnetic gap between them;
   (d) wherein the record/playback head extends through the cavity opening in the housing body curved front face to bring the core side legs on either side of the record medium; and
   (e) wherein means is provided to move the head holder in direction transverse to the direction of record medium movement.

2. The housing apparatus of claim 1 wherein:
   (f) the effective dimension of the housing body of the housing apparatus in direction transverse to the direction of record medium movement is substantially less than twice the transverse dimension of the widest record medium with which the housing apparatus is designed to function.

3. In a machine for magnetic recording and playback of data on a plurality of parallel tracks of a record medium moving longitudinally on a transport path past a record/playback head, a housing apparatus operable to selectively align at least one record/playback head with each one of the record tracks; the housing apparatus including:
   (a) a housing body fixedly secured proximate to the transport path and having a convex front face non-linear in longitudinal section and lying in contact with the record medium across the entire transverse dimension of the record medium at two closely spaced-apart areas along the record medium transport path, the housing body being provided with a head holder encompassing cavity therein and a magnetic core positioning tongue receiving slot extending in direction transverse to the direction of record medium movement, said housing body slot being open from said housing body cavity through its non-linear front face between the two spaced locations;
   (b) a record/playback head holder mounted in the housing body cavity for movement with respect to the housing body in direction transverse to that of record medium movement, said holder including a magnetic core positioning tongue extending into the housing body slot;
   (c) at least one record/playback head mounted in the head holder, said head including:
      (1) a composite magnetic core having a core body which includes a pair of side legs together defining a convex curved forward face, the side legs being spaced apart to provide an effective non-magnetic gap between them, the core body also including another leg completing a magnetic path to the effective gap, and
      (2) at least one wound-wire coil around one of the core body legs;
   (d) wherein the core body is mounted in the head holder so that its curved forward face, including the effective gap, extends through the housing body slot in alignment with the direction of record medium movement, beyond the non-linear front face of the housing body and into contact with the record medium; and
   (e) wherein means is provided to move the head holder in direction transverse to the direction of record medium movement.

4. The housing apparatus of claim 3 wherein:
   (f) the head holder is provided with an internal screw follower thread having an axis transverse to the alignment of the core body forward face; and
   (g) the means to move the head holder includes:
      (1) a servo motor lead screw rotatably mounted with respect to the housing body on an axis transverse to the direction of motion of the record medium, the lead screw being in operational contact with said screw follower thread and having an axis coextensive with that of the screw follower thread, and
      (2) a servo motor fixedly mounted with respect to the housing body and having a servo motor drive shaft in driving relation to the lead screw.

5. The housing apparatus of claim 3 wherein:
   (f) a pair of mutually parallel, spaced-apart ceramic bars form front corner portions of the housing body front wall, these bars defining edges of the housing body slot transverse to the direction of record medium movement, and together providing front facing bearing surfaces to support the entire transverse dimension of the recording medium on both sides of the curved forward face of the core side legs.

6. The housing apparatus of claim 5 wherein:
   (g) the convex non-linear front surfaces of the ceramic bars are curved surfaces, each defined by a segment of a right circular cylinder so positioned that a trace of the record medium transverse to the direction of its movement along the transport path comes into its first contact with the housing body on the front surface of one of the ceramic bars and leaves its last contact with the housing body on the front surface of the other of said bars.

7. The housing apparatus of claim 6 wherein:
(h) the curved forward face of each of the side legs of the core body is defined by a segment of a right circular cylinder and the portion which includes the effective gap extends beyond the farthest forward surfaces of the ceramic bars sufficiently so that the record medium between the core body and the curved surface of each ceramic bar lies tangent to the surface of that bar.

8. The housing apparatus of claim 7 wherein:
(i) the radius of the right circular cylinder defining the curved forward face of the side legs of the core body is equal to or less than the radius of the right circular cylinder which defines the convex curved front surface of either ceramic bar, and the center of each such cylinder lies on a plane midway between said slot defining edges of the ceramic bars and in normal relation to the direction of movement of the record medium.

9. The housing apparatus of claim 4 wherein:
(h) a pair of mutually parallel, spaced-apart ceramic bars form front corner portions of the housing front wall, these bars providing opposed, spaced apart, facing surfaces defining edges of the housing body slot transverse to the direction of record movement, and together providing curved front facing bearing surfaces to support the recording medium on both sides of the curved forward face of the core side legs.

10. The housing apparatus of claim 9 wherein:
(i) the two facing surfaces of the ceramic bars which define edges of the housing body slot are precisely parallel to each other, each defining a plane parallel to the axis of the lead screw, these parallel surfaces constituting guide surfaces for the core positioning tongue; and
(j) said core positioning tongue is partially defined by mutually precisely parallel, outwardly facing, head holder positioning surfaces, each parallel to the axis of the internal screw follower thread, and each lying in contacting guided relationship with respect to one of the two facing ceramic bar guide surfaces.

11. In a machine for magnetic recording and playback of data on a plurality of parallel tracks of a magnetic tape moving longitudinally on a transport path past a record/playback head, a housing apparatus operable to selectively align at least one record/playback head with each of the record tracks; the housing apparatus including:
(a) a housing body fixedly secured proximate to the transport path and having a front face convex and curved in longitudinal cross section and lying in contact with the magnetic tape across the entire transverse dimension of the tape at two closely spaced-apart locations along the tape transport path, the housing body being provided with a head holder encompassing cavity therein and a magnetic core positioning tongue receiving slot extending in direction transverse to the direction of magnetic tape movement, said housing body slot being open from said housing body cavity and through its curved front face between the two spaced-apart locations;
(b) a record/playback head holder mounted in the housing body cavity for movement with respect to the housing body in direction transverse to that of the magnetic tape movement, said holder including a magnetic core positioning tongue extending into the housing body slot;
(c) at least one record/playback head mounted in the head holder, said head including:
(1) a composite magnetic core having a core body which includes a pair of side legs together defining a curved forward face, the side legs being spaced apart to provide an effective non-magnetic gap between them, the core body having another leg completing a magnetic path to the effective gap, and
(2) at least one wound-wire coil around one of the core legs;
(d) wherein the core body is mounted in the head holder so that its curved forward face, including the effective gap, extends through the housing body slot in alignment with the direction of magnetic tape movement, beyond the curved front face of the housing body, and into contact with the magnetic tape; and
(e) wherein means is provided to move the head holder in direction transverse to the direction of record movement.

12. The housing apparatus of claim 11 wherein:
(f) the effective dimension of the housing body of the housing apparatus in direction transverse to the direction of tape movement is substantially less than twice the transverse dimension of the widest magnetic tape with which the housing apparatus is designed to function.

13. In a machine for magnetic recording and playback of data on a plurality of parallel tracks of a magnetic tape which is moving longitudinally on a transport path past a record/playback head, a housing apparatus operable to selectively align at least one record/playback head with respect to each one of the record tracks; the housing including:
(a) a housing body fixedly secured proximate to the transport path and having a convex curved front face lying in contact with the magnetic tape across the entire transverse dimension of the tape at two closely spaced-apart locations along the tape transport path, the housing body being provided with a head holder receiving cavity therein which is open through its curved front face between the two spaced-apart locations;
(b) a record/playback head holder mounted in the housing body cavity for movement with respect to the housing body in direction transverse to the direction of magnetic tape movement;
(c) at least one record/playback head mounted in the head holder and including a composite magnetic core having a core body which includes a pair of side legs together defining a convex curved forward face, the side legs being spaced apart to provide an effective non-magnetic gap between them;
(d) wherein the record/playback head extends through the cavity opening in the housing body rounded front face to bring the curved forward face of the core side legs, including the effective gap, into contact with the magnetic tape in alignment with direction of magnetic tape movement; and (e) wherein means is provided to move the head holder in direction transverse to the direction of magnetic tape movement.

14. The housing apparatus of claim 13 wherein:

(f) the head holder is provided with an internal screw follower thread having an axis transverse to the alignment of the core body forward face; and (g) the means to move the head holder includes:
  (1) a servo motor lead screw rotatably mounted with respect to the housing body on an axis transverse to the direction of motion of the magnetic tape, the lead screw being in operational contact with said screw follower thread and having an axis coextensive with that of the screw follower thread, and
  (2) a servo motor fixedly mounted with respect to the housing body and having a servo motor drive shaft in driving relation to the lead screw.

15. The housing apparatus of claim 13 wherein:

(f) a pair of mutually parallel, spaced-apart ceramic bars form front corner portions of the housing body front face, these bars defining forward edges of the housing body cavity opening to the rounded front face of the housing body, these bars together providing convex curved front facing bearing surfaces to support the magnetic tape on both sides of the curved forward face of the core side legs.

16. The housing apparatus of claim 15 wherein:

(g) the convex curved front facing surfaces of the ceramic bars are each defined by a segment of a right circular cylinder so positioned that a trace of the magnetic tape transverse to the direction of its movement along the transport path comes into its first contact with the housing body on the front surface of one of the ceramic bars and leaves the last contact with the housing body on the front surface of the other of said bars.

17. The housing apparatus of claim 16 wherein:

(h) the curved forward face of each of the side legs of the core body is defined by a segment of a right circular cylinder and the portion which includes the effective gap extends beyond the farthest front faces of the ceramic bars sufficiently so that the magnetic tape between the core body and the curved surface of each ceramic bar lies tangent to the surface of that bar.

18. The housing apparatus of claim 17 wherein:

(i) the radius of the right circular cylinder defining the forward face of the side legs of the core body is equal to or less than the radius of the right circular cylinder which defines the convex curved front face of either ceramic bar and the center of each such cylinder lies on a plane midway between said slot defining edges of the ceramic bars and in normal relation to the direction of movement of the magnetic tape.

19. The housing apparatus of claim 14 wherein:

(h) a pair of mutually parallel, spaced-apart ceramic bars form front corner portions of the housing front wall, these bars providing opposed, spaced-apart, facing surfaces of forward edges of the housing body cavity and together providing curved front facing bearing surfaces to support the magnetic tape on both sides of the curved forward face of the core side legs.

20. The housing apparatus of claim 19 wherein:

(i) the two facing surfaces of the ceramic bars which define forward edges of the housing body cavity are precisely parallel to each other, each defining a plane parallel to the axis of the lead screw, these parallel surfaces constituting guide surfaces for the head holder; and (j) a portion of the head holder extending between these ceramic blocks is partially defined by mutually precisely parallel, outwardly facing, head holder positioning surfaces, each parallel to the axis of the internal screw follower thread, and each lying in contacting guided relationship with respect to one of the two facing ceramic guide surfaces.

21. In a machine for magnetic recording and playback of data on a plurality of parallel tracks of a magnetic tape of a predetermined maximum transverse dimension, the tape moving longitudinally on a longitudinally fixed transport path past a record/playback head: a housing apparatus operable to selectively operably align at least one record/playback head with each of the record tracks while supporting the tape across its entire transverse dimension immediately before and after the head is operably aligned with that track; the housing apparatus including:

(a) a housing body fixedly secured proximate to the transport path and having a fixedly positioned front face of convex rounded configuration and of dimension and position to lie in contact with the magnetic tape across the entire predetermined maximum transverse dimension of the tape at two closely spaced-apart locations along the tape transport path, the housing body being provided with a head holder encompassing cavity and with a magnetic core positioning tongue receiving slot extending in direction transverse to the direction of magnetic tape movement, said housing body slot being open from said housing body cavity and through its curved front face between the two spaced-apart locations;

(b) a record/playback head holder mounted in the housing body cavity for limited movement with respect to the housing body in direction transverse to that of the magnetic tape movement, said holder including a magnetic core positioning tongue extending into the housing body slot;

(c) at least one regular record/playback head mounted in the head holder, said head including:
  (1) a composite magnetic core having a core body which includes a pair of side legs together defining a curved forward face, the side legs being spaced apart to provide an effective non-magnetic gap between them, the core body having another leg completing a magnetic path to the effective gap, and
  (2) at least one wound-wire coil around one of the core legs;

(d) wherein the core body is mounted in the head holder so that its curved forward face, including the effective gap, extends through the housing body slot in alignment with the direction of magnetic tape movement, beyond the rounded front face of the housing body, and into contact with the magnetic tape;

(e) wherein the limited movement of the head holder with respect to the housing body is between a first position where a record/playback head is aligned with the parallel track of the magnetic tape closest to a first edge of that tape and a second position where a record/playback head is aligned with the parallel track closest to a second opposite edge of said magnetic tape; and (f) wherein means is provided to move the head holder in direction transverse to the direction of tape movement between its first and second positions while the magnetic tape continues its movement on its fixed transport path while maintaining the same spacial relation to the curved front face of the housing body with which it is in contact at the two spaced-apart locations.

22. The housing apparatus of claim 21 wherein:

(g) the maximum dimension transverse to the direction of tape movement of the area of contact of the curved front face of the housing body with the magnetic tape is no greater than the nominal transverse width of the tape plus any deviations in the tape above that nominal width.

* * * * *

UNITED STATES PATENT AND TRADEMARK OFFICE
CERTIFICATE OF CORRECTION

PATENT NO. : 5,179,486

DATED : January 12, 1993

INVENTOR(S) : JOHN C. KRAEMER, PAUL R. IVERSON

It is certified that error appears in the above-identified patent and that said Letters Patent is hereby corrected as shown below:

On the Title Page, in the References Cited Section, under U.S. PATENT DOCUMENTS, insert the following:

```
3,539,191   11/1970   Yamaoto      .....274/4
3,692,255    9/1972   Von Behren   .....242/192
4,313,143    1/1982   Zarr         .....360/106
4,322,764    3/1982   Tamaka       .....360/129
4,658,314    4/1987   Sasazaki     .....360/103
4,686,596    8/1987   Kraemer et al...360/126
```

Signed and Sealed this

Second Day of November, 1993

Attest:

BRUCE LEHMAN

Attesting Officer — Commissioner of Patents and Trademarks